US012132553B2

(12) United States Patent
Zhang et al.

(10) Patent No.: US 12,132,553 B2
(45) Date of Patent: Oct. 29, 2024

(54) UE UPLINK PANEL SELECTION FRAMEWORK

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Fangli Xu, Beijing (CN); Haijing Hu, Beijing (CN); Haitong Sun, Cupertino, CA (US); Hong He, Cupertino, CA (US); Jie Cui, San Jose, CA (US); Oghenekome Oteri, San Diego, CA (US); Wei Zeng, San Diego, CA (US); Weidong Yang, San Diego, CA (US); Yang Tang, San Jose, CA (US); Yuchul Kim, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/916,884

(22) PCT Filed: Apr. 8, 2020

(86) PCT No.: PCT/CN2020/083654
§ 371 (c)(1),
(2) Date: Oct. 4, 2022

(87) PCT Pub. No.: WO2021/203263
PCT Pub. Date: Oct. 14, 2021

(65) Prior Publication Data
US 2023/0155660 A1    May 18, 2023

(51) Int. Cl.
*H04B 7/02* (2018.01)
*H04B 7/06* (2006.01)

(52) U.S. Cl.
CPC ......... *H04B 7/0695* (2013.01); *H04B 7/0691* (2013.01)

(58) Field of Classification Search
CPC ........................... H04B 7/0695; H04B 7/0691
(Continued)

(56) References Cited

U.S. PATENT DOCUMENTS

| 2019/0260456 A1* | 8/2019 | Zhou | H04B 7/0695 |
| 2021/0083748 A1* | 3/2021 | Guan | H04B 7/0691 |

FOREIGN PATENT DOCUMENTS

| CN | 110447264 | 11/2019 |
| CN | 110536456 | 12/2019 |

(Continued)

OTHER PUBLICATIONS

International Search Report and Written Opinion for PCT Patent Application No. PCT/CN2020/083654; 9 pages; Dec. 30, 2020.
(Continued)

*Primary Examiner* — Zewdu A Kassa
(74) *Attorney, Agent, or Firm* — Kowert, Hood, Munyon, Rankin & Goetzel, P.C.

(57) ABSTRACT

Apparatuses, systems, and methods for user equipment device (UE) uplink antenna panel selection. The UE may determine, based on at least one condition, to perform a beam switch from a current beam being used for communications with a base station. The UE may transmit, to the base station, an indication of an antenna panel status that may include an indication of a latency associated with the beam switch. The UE may receive, from the base station, an indication to switch to a target beam and to perform the switch, based on the indication, to the target beam. The indication of the antenna panel status may include a beam switching latency level for each beam in a beam report, a beam switch request that may indicate the target beam,
(Continued)

and/or a beam switch request that may indicate that an antenna panel switch is to be applied by the UE.

20 Claims, 18 Drawing Sheets

(58) Field of Classification Search
USPC ............... 375/267, 260, 259, 219, 295, 316
See application file for complete search history.

(56) References Cited

FOREIGN PATENT DOCUMENTS

| WO | 2018127264 | 7/2018 |
|----|------------|--------|
| WO | 2019029609 | 2/2019 |
| WO | 2019140256 | 7/2019 |

OTHER PUBLICATIONS

CMCC "Discussion on DCI Contents for NR"; 3GPP TSG RAN WG1 Meeting #89 R1-1708399; Hangzhou, China; 8 pages; May 15, 2017.
Samsung "PHR triggering event for bearn change"; 3GPP TSG-RAN WG2 #99bis R2-1711800; Prague, Czech Republic; 3 pages; Oct. 9, 2017.
Qualcomm Inc "Further discussion on UL one shot timing adjustment"; 3PP RAN #94-e R4-2002062; 4 pages; Feb. 24, 2020.
Office Action for CN Patent Application No. 202080099600.1; Sep. 5, 2024.

* cited by examiner

| CSI Report Number | CSI Fields | | | | | | | | | | | |
|---|---|---|---|---|---|---|---|---|---|---|---|---|
| | | CRI or SSBRI #1, if reported | CRI or SSBRI #2, if reported | CRI or SSBRI #3, if reported | CRI or SSBRI #4, if reported | Differential RSRP #1, if reported | Differential RSRP #2, if reported | Differential RSRP #3, if reported | Differential RSRP #4, if reported | Latency for CRI or SSBRI #1 | Latency for CRI or SSBRI #2 | Latency for CRI or SSBRI #3 | Latency for CRI or SSBRI #4 |
| CSI report #n | | | | | | | | | | | | |

FIG. 11

UE UPLINK PANEL SELECTION FRAMEWORK

FIELD

The invention relates to wireless communications, and more particularly to apparatuses, systems, and methods for UE uplink antenna panel selection.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR may provide a higher capacity for a higher density of mobile broadband users, also supporting device-to-device, ultra-reliable, and massive machine type communications with lower latency and/or lower battery consumption. Further, the 5G-NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for UE uplink antenna panel selection.

In some embodiments, a user equipment device (UE) may be configured to determine, based, at least in part, on at least one condition (e.g., a condition associated with beam quality as measured by the UE), to perform a beam switch from a current beam being used for communications with a base station. The UE may be configured to transmit, to the base station, an indication of an antenna panel status that may include an indication of a latency associated with the beam switch. The UE may be configured to receive, from the base station, an indication to switch to a target beam and to perform the switch, based on the indication, to the target beam. The performance of the switch may occur within a time period associated with the latency. In some embodiments, the at least one condition may include a minimum beam quality from a beam in a first beam set measured from a target antenna panel is larger than a minimum beam quality measured from a current antenna panel plus a margin, a maximum beam quality from a beam in first beam set measured from a target antenna panel is larger than a maximum beam quality measured from the current antenna panel plus a margin, an average beam quality from one or more target beams in a first beam set measured from a target antenna panel is larger than an average beam quality measured from the current antenna panel plus a margin and/or a beam quality from a target beam in a first beam set measured from a target antenna panel is larger than a beam quality measured from the current antenna panel plus a margin. In some embodiments, the indication of the antenna panel status may include a beam switching latency level for each beam in a beam report. In some embodiments, the indication may include a beam switch request that may indicate the target beam. In some embodiments, the beam switch request may include an indication that an antenna panel switch is to be applied by the UE.

The techniques described herein may be implemented in and/or used with a number of different types of devices, including but not limited to unmanned aerial vehicles (UAVs), unmanned aerial controllers (UACs), base stations, access points, cellular phones, tablet computers, wearable computing devices, portable media players, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 11 illustrates an example of a beam report that includes beam switching latency levels, according to some embodiments.

Figure 1A:
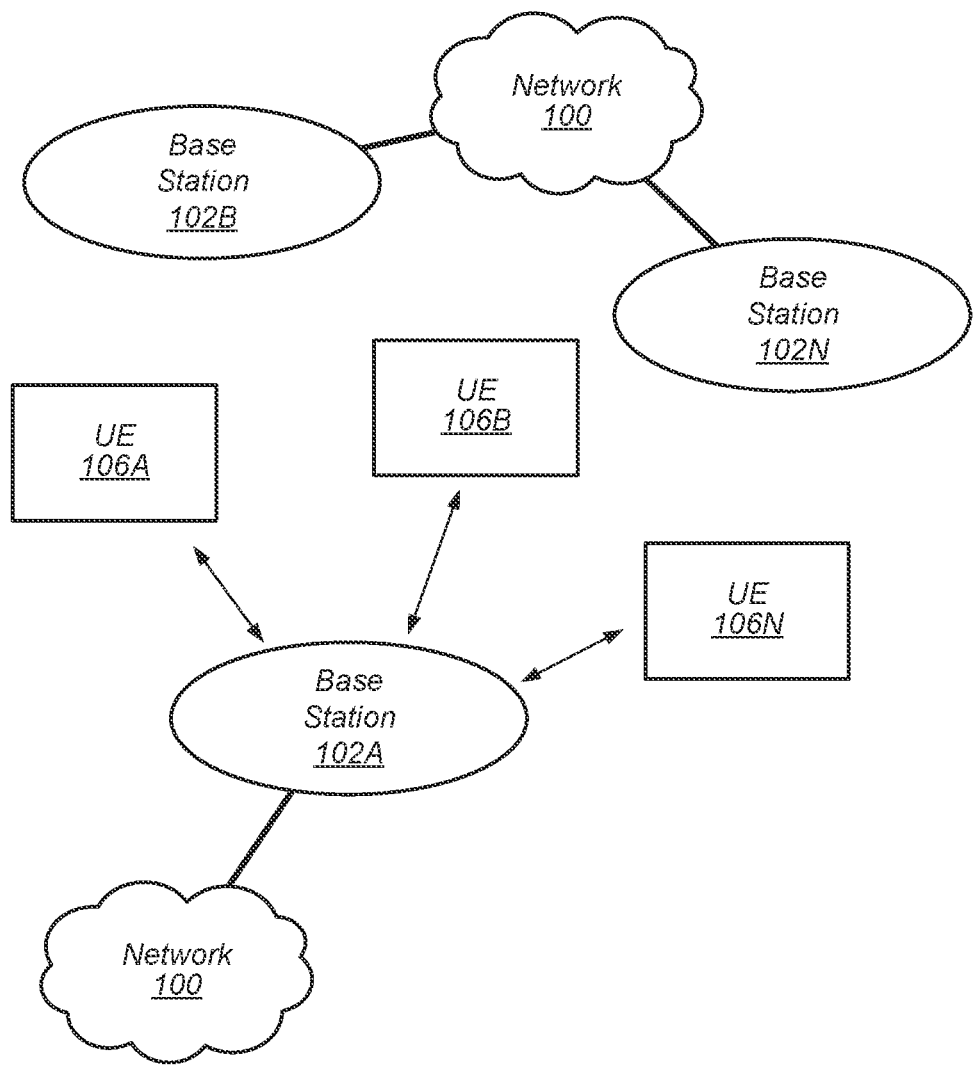
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
IE: Information Element

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™, laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by (or with) a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
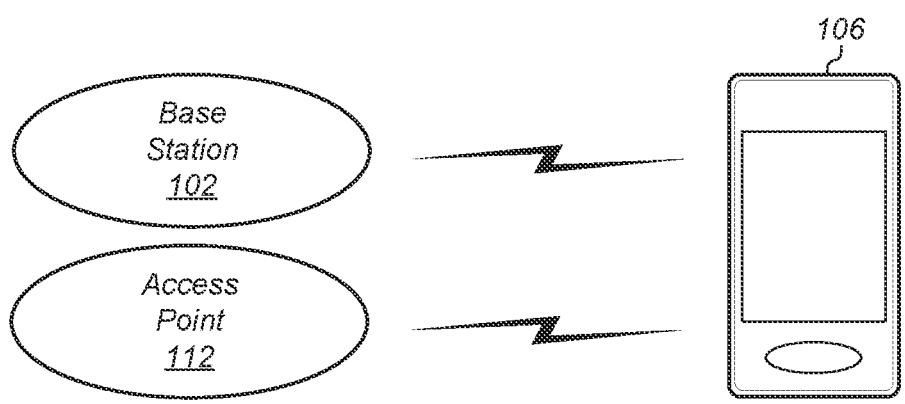
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
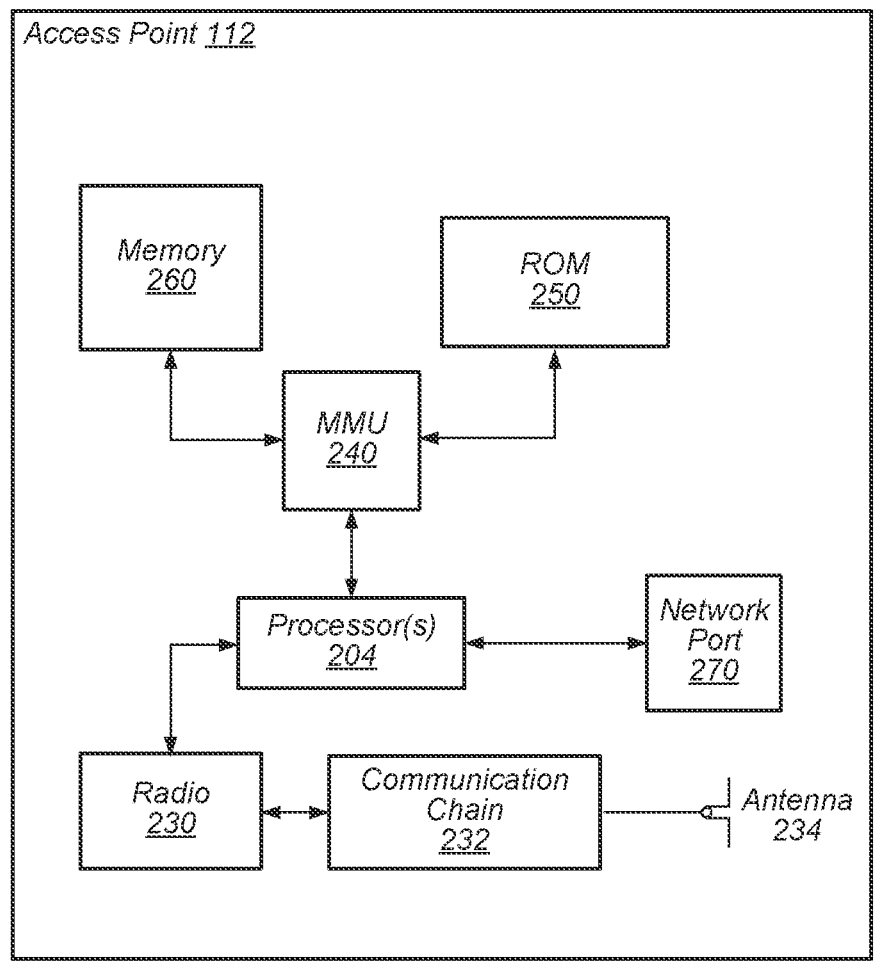
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for UE uplink antenna panel selection as further described herein.

Figure 3:
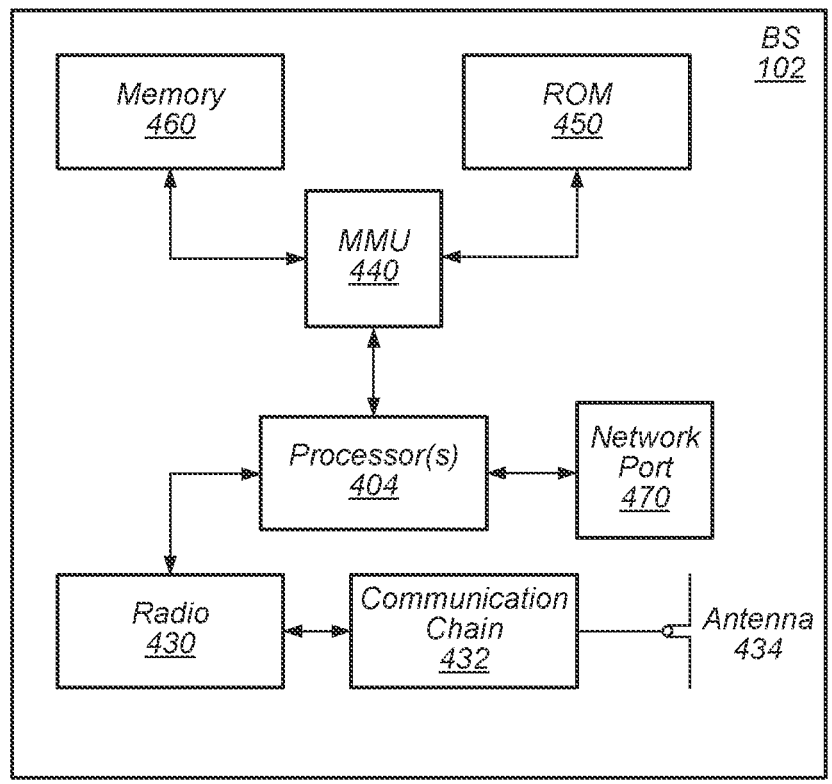
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
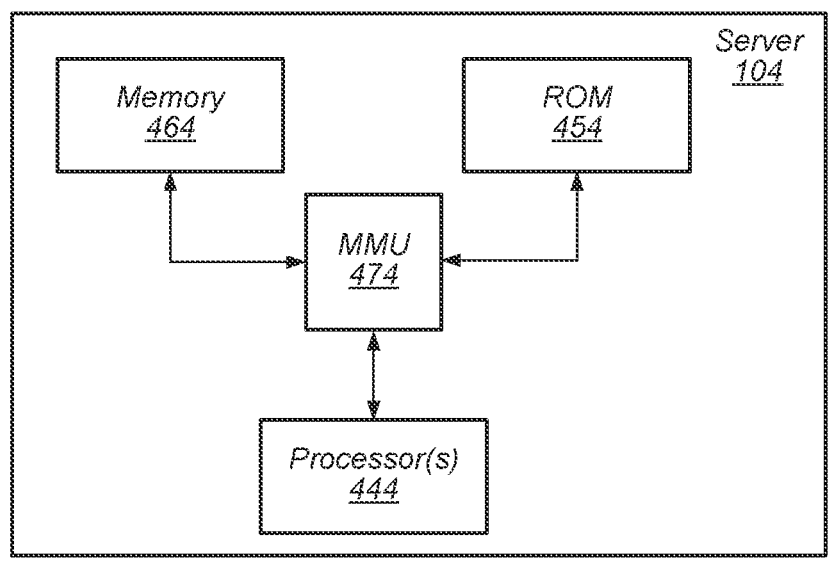
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102 and/or UE devices 106, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
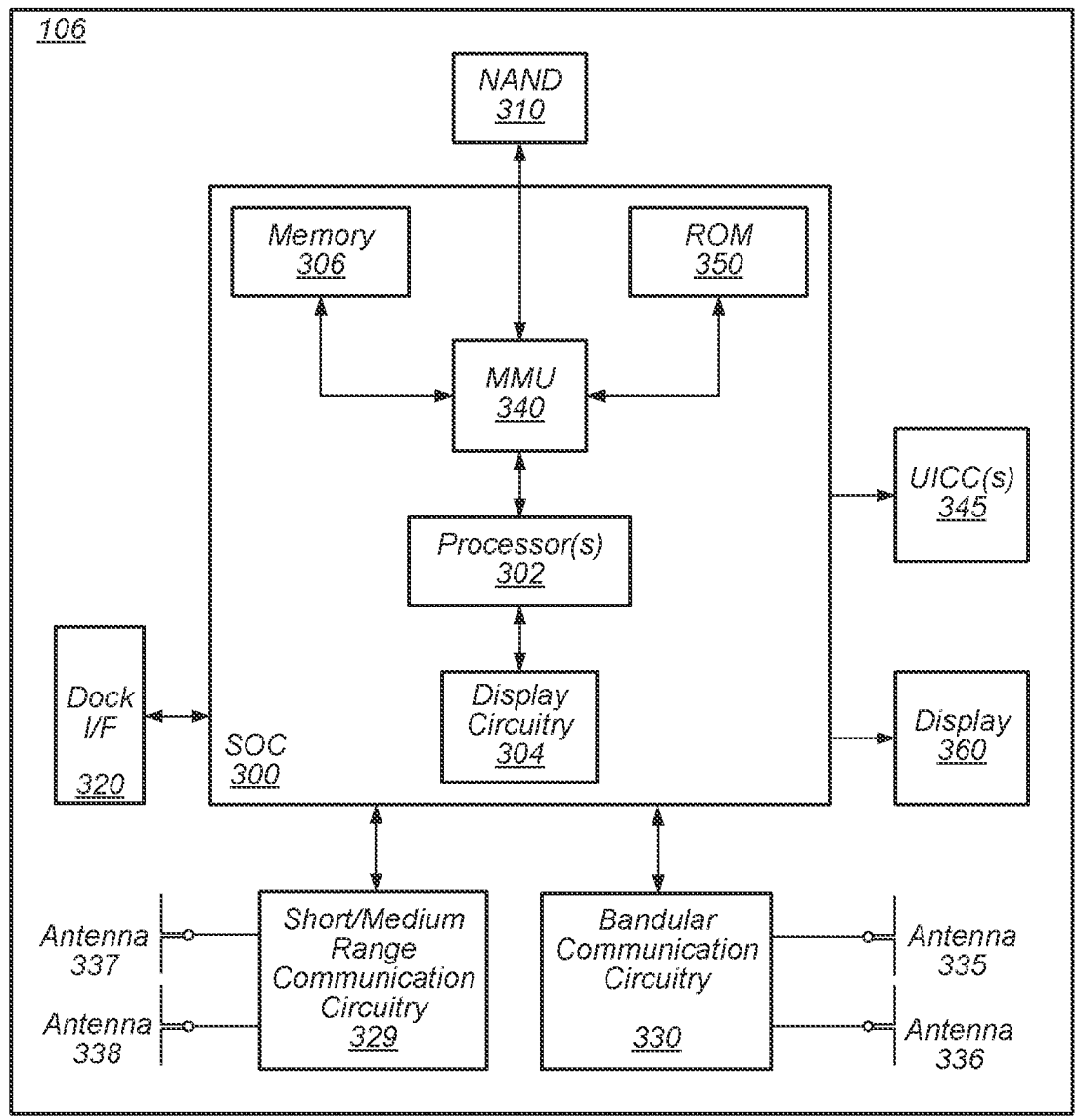
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for UE uplink antenna panel selection as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
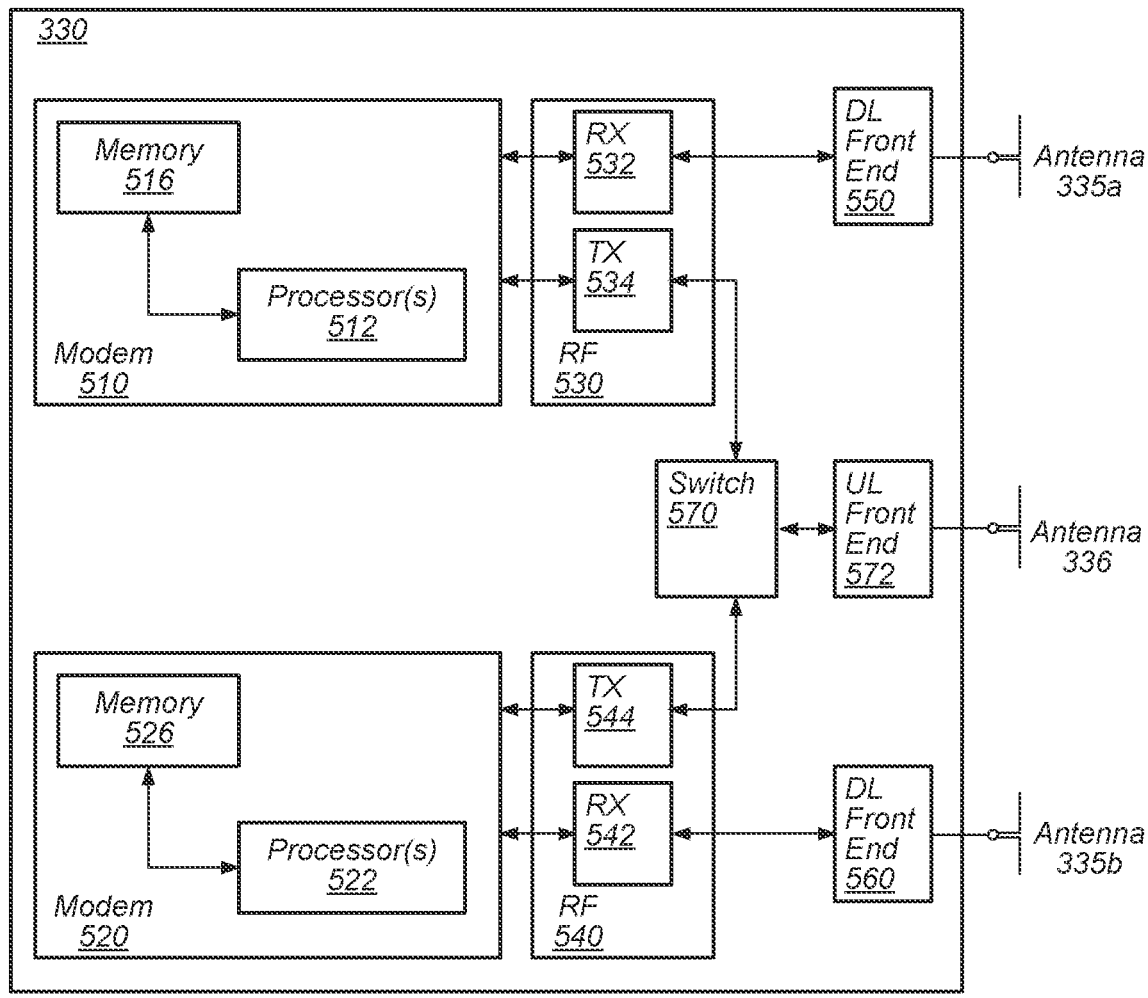
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 5A). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5B, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods UE uplink antenna panel selection as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
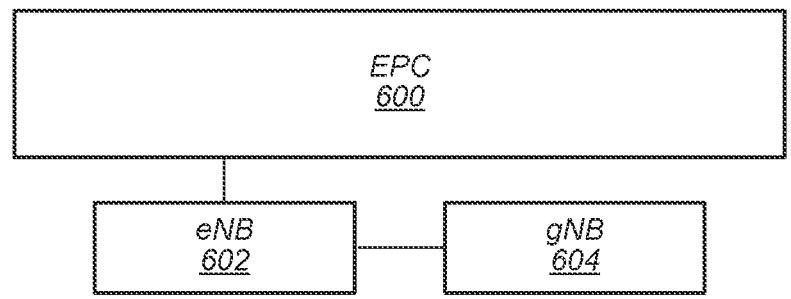
FIG. 6A illustrates an example of connections between an EPC network, an LTE base station (eNB), and a 5G NR base station (gNB).
Figure 6B:
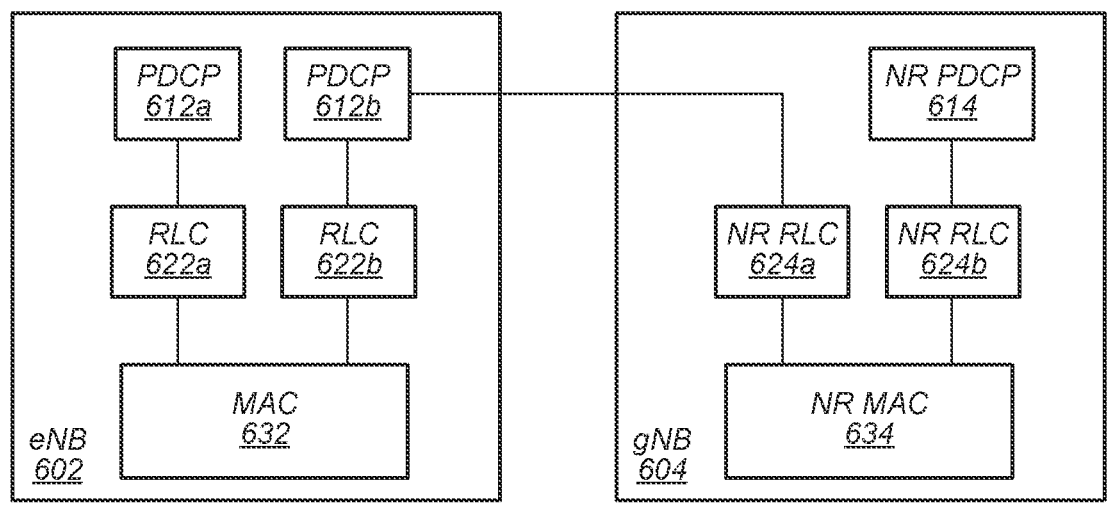
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
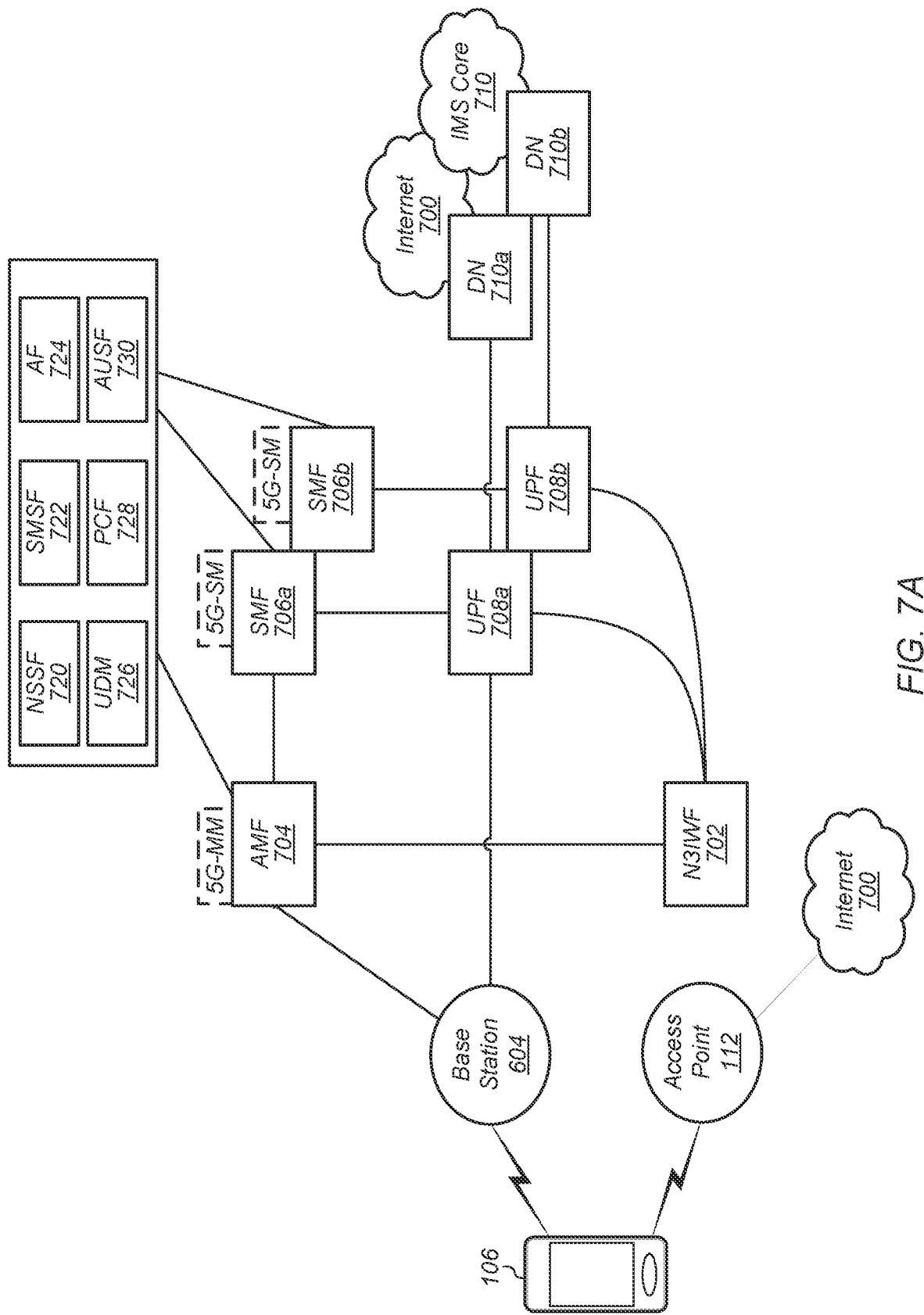
FIG. 7A illustrates an example of a 5G network architecture that incorporates both 3GPP (e.g., cellular) and non-3GPP (e.g., non-cellular) access to the 5G CN, according to some embodiments.
Figure 7B:
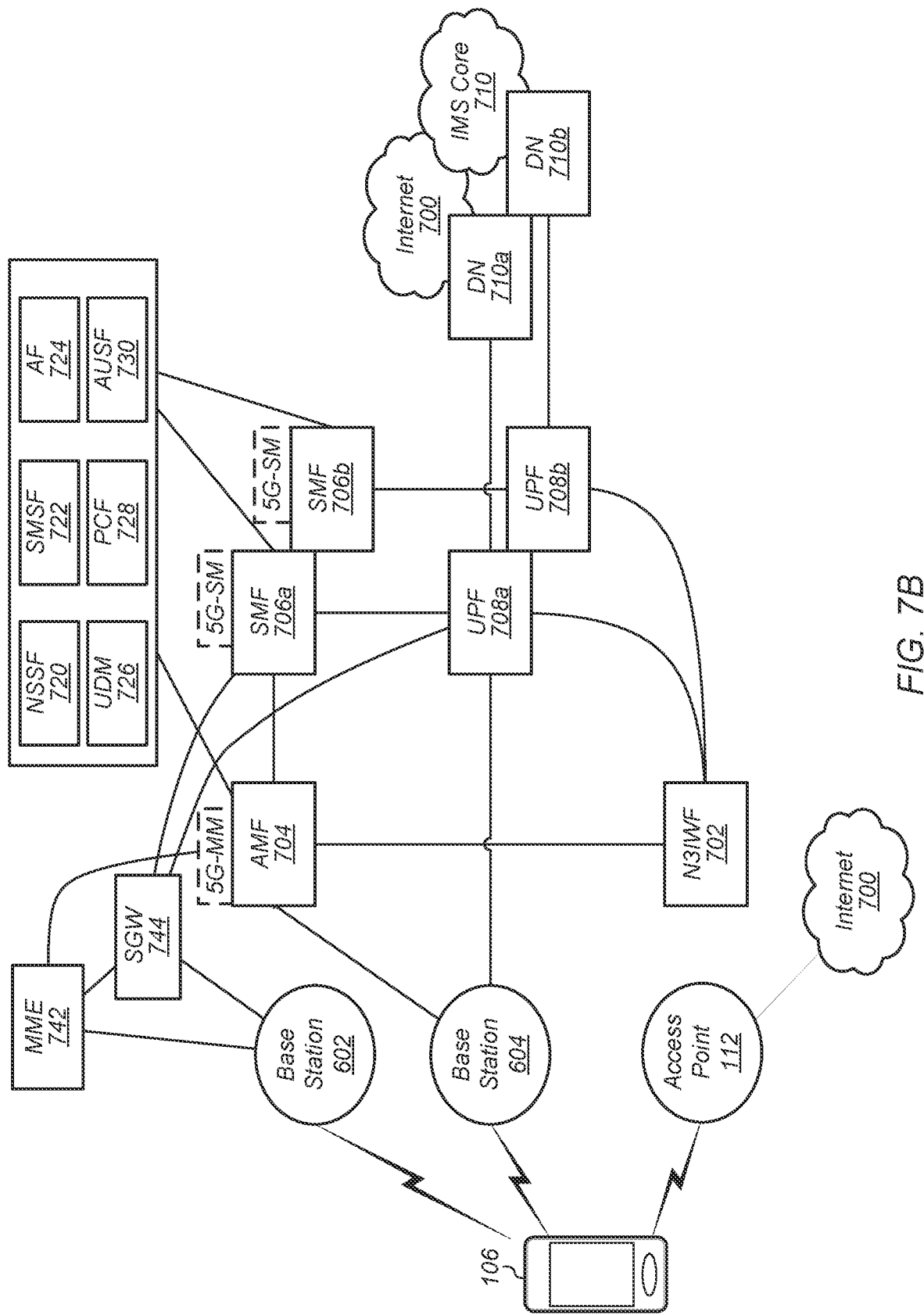
FIG. 7B illustrates an example of a 5G network architecture that incorporates both dual 3GPP (e.g., LTE and 5G NR) access and non-3GPP access to the 5G CN, according to some embodiments.
Figure 8:
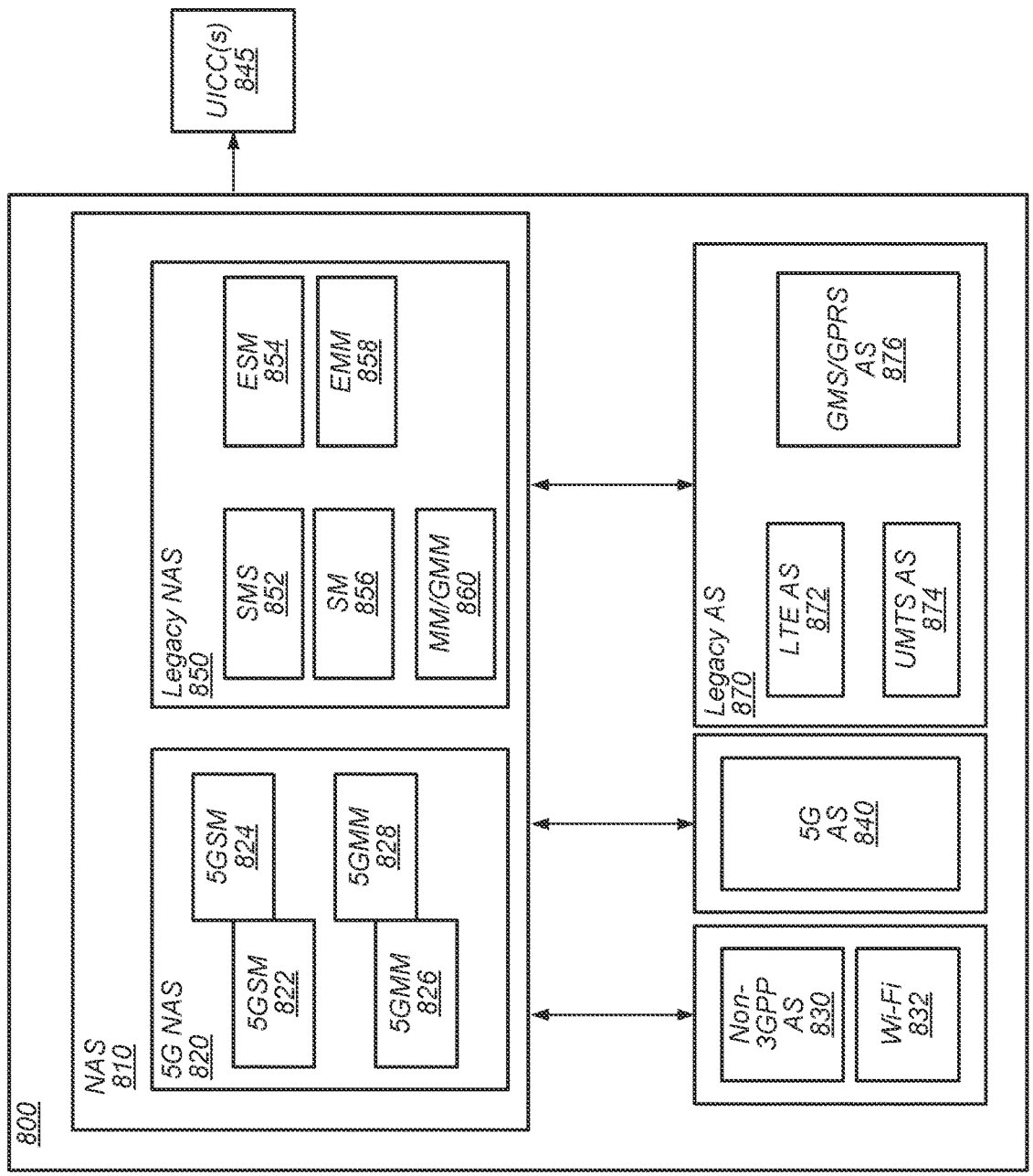
FIG. 8 illustrates an example of a baseband processor architecture for a UE, according to some embodiments.

FIGS. 7A, 7B and 8: 5G Core Network Architecture—Interworking with Wi-Fi

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706a and the SMF 706b of the 5G CN. The AMF 706 may be connected to (or in communication with) the SMF 706a. In some embodiments, such functional entities may reside on (and/or be executed by and/or be supported by) one or more servers 104 located within the RAN and/or core network. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms UE uplink antenna panel selection, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods UE uplink antenna panel selection, e.g., as further described herein.

UE Unlink Antenna Panel Selection

In current implementations, a user equipment device (UE) may be equipped with (and/or include) multiple antenna panels and may have the capability to select an antenna panel and/or a subset of antenna panels for communication with a base station and/or a group of base stations. In some implementations, directional antennas may be used in each antenna panel. Additionally, different antenna panels may target different directions for full coverage, e.g. a two-antenna panel UE may be equipped with antenna panels targeting opposite directions.

In addition, in current implementations of 3GPP New Radio (NR) Release 17, "fast" uplink (UL) antenna panel selection has been specified as:

Identify and specify features to facilitate UL beam selection for UEs equipped with multiple panels, considering UL coverage loss mitigation due to MPE, based on UL beam indication with the unified TCI framework for UL fast panel selection.

Thus, to support fast UL antenna panel selection based on a TCI framework, various aspects need to be considered, e.g., such as:
(1) how to determine when a panel switching is needed;
(2) how to define reporting content for a UE to let a base station know an UL antenna panel status for a beam; and
(3) how to define control signaling for antenna panel switching based on TCI framework. In addition, an antenna panel selection framework may also follow the following principles:
(1) an antenna panel selection framework should avoid disclosure of aspects of a UE's implementation, e.g., such as antenna architecture; and
(2) an antenna panel selection framework should provide a UE with flexibility to selectively turn on/off an antenna panel for power savings.

Embodiments described herein provide systems, methods, and mechanisms to support an uplink antenna panel selection framework. In some embodiments, a UE, such as UE 106, may base a determination to switch antenna panels based on one or more conditions. In some embodiments, a UE, may report a required latency for an antenna panel switch and/or whether additional latency is required for an antenna panel switch. In some embodiments, a UE may report a beam switching latency level for each beam in a beam report. In some embodiments, a UE may report only beams with a first level of beam switching latency level. In some embodiments, an antenna panel switch may be based on a beam indication received from a base station, such as base station 102. In some embodiments, an antenna panel switch may be triggered (and/or based on) a UE request.

In some embodiments, conditions that a UE may base an antenna panel switch may include any, any combination of, and/or all of:
(1) a minimum beam quality from a beam in a beam set X measured from a target antenna panel is larger than a minimum beam quality measured from a current (and/or source) antenna panel plus a margin (and/or offset);
(2) a maximum beam quality from a beam in a beam set X measured from a target antenna panel is larger than a maximum beam quality measured from a current (and/or source) antenna panel plus a margin (and/or offset);
(3) an average beam quality from a beam(s) in a beam set X measured from a target antenna panel is larger than an average beam quality measured from a current (and/or source) antenna panel plus a margin (and/or offset); and/or
(4) a beam quality from a beam in a beam set X measured from a target antenna panel is larger than a beam quality measured from a current (and/or source) antenna panel plus a margin (and/or offset).

In some embodiments, a target beam may be configured by higher layer signaling and/or predefined, e.g. a first beam corresponding to a lowest Transmission Configuration Indicator (TCI) state identifier (ID) activated by a medium access control (MAC) control element (CE). In some embodiments, a beam set X may be configured by higher layer signaling, e.g. a beam set corresponding to TCI states activated by a MAC CE. In some embodiments, a margin and/or offset may be configured by higher layer signaling, predefined, and/or reported by a UE capability.

In some embodiments, a beam quality may be based on a reference signal receiving power (RSRP), a signal-to-interference plus noise ratio (SINR), and/or power headroom (PHR) for a measured beam, among other beam quality metrics and/or parameters. In some embodiments, a beam quality metric and/or parameter used to determine beam quality may be predefined and/or configured by higher layer signaling, such as radio resource control (RRC) signaling.

Figure 9:
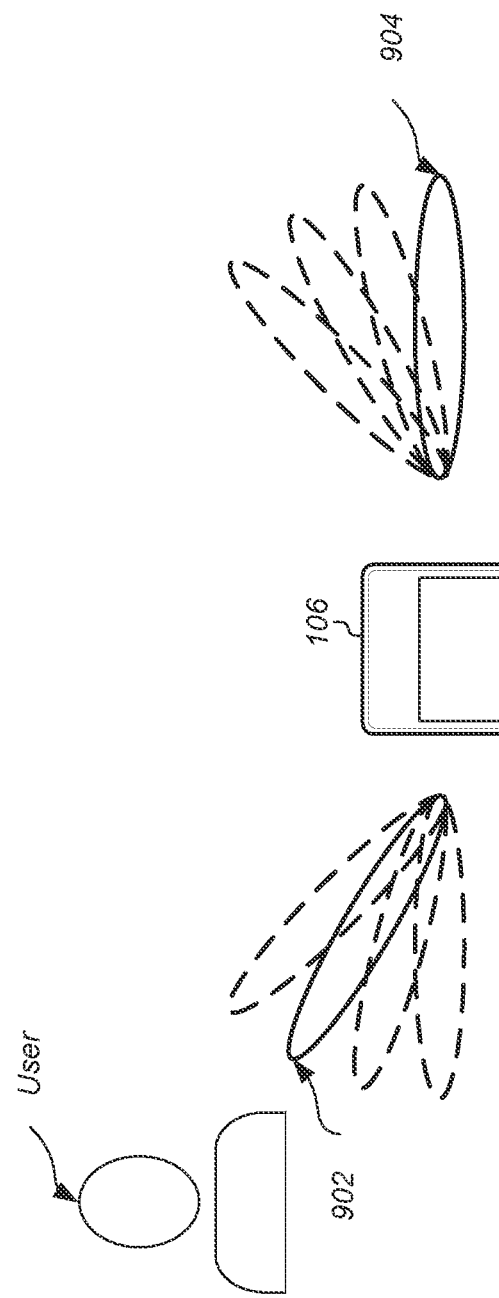
FIG. 9 illustrates an example of beam selection based on a maximum power reduction (MPR), according to some embodiments.

In some embodiments, a maximum power reduction (MPR) may be included with regard to maximum permissible exposure (MPE) (e.g., maximum permissible power emission) to a human body to determine a beam quality. For example, a beam quality may be equal to a measured RSRP less an MPR. As another example, a beam quality may be based on a power headroom (PHR) with regard to MPR impact, where the PHR may be measured based on a Synchronization Signal Block (SSB) or Channel State Information Reference Signal (CSI-RS) corresponding to the beam. In some embodiments, as illustrated by FIG. 9, an MPR may be beam specific and/or antenna panel specific. For example, as shown, a beam 902 in an antenna panel 1 of UE 106 may have a first MPR and may be in a direction of a user. Additionally, beam 904 in an antenna panel 2 of UE 106 may have a second MPR different from the first MPR. In some embodiments, the second MPR may cause less of a reduction in measured RSRP than the first MPR based on the beam 902 being in the direction of the user and beam 904 not being in the direction of the user. In some embodiments, an MPR for each antenna panel may be reported to a base station.

In some embodiments, to switch to an activated antenna panel, a UE may perform antenna panel switching with the same latency as a UE beam switching within an antenna panel. In some embodiments, to switch to an inactivated antenna panel, a UE may need additional latency to activate the panel. Thus, in some embodiments, for a beam reporting instance, it may not be necessary to report an antenna panel index (which may disclose a UE's antenna architecture), instead, a UE may report whether additional latency is needed and/or required to switch to a beam.

Figure 10A:
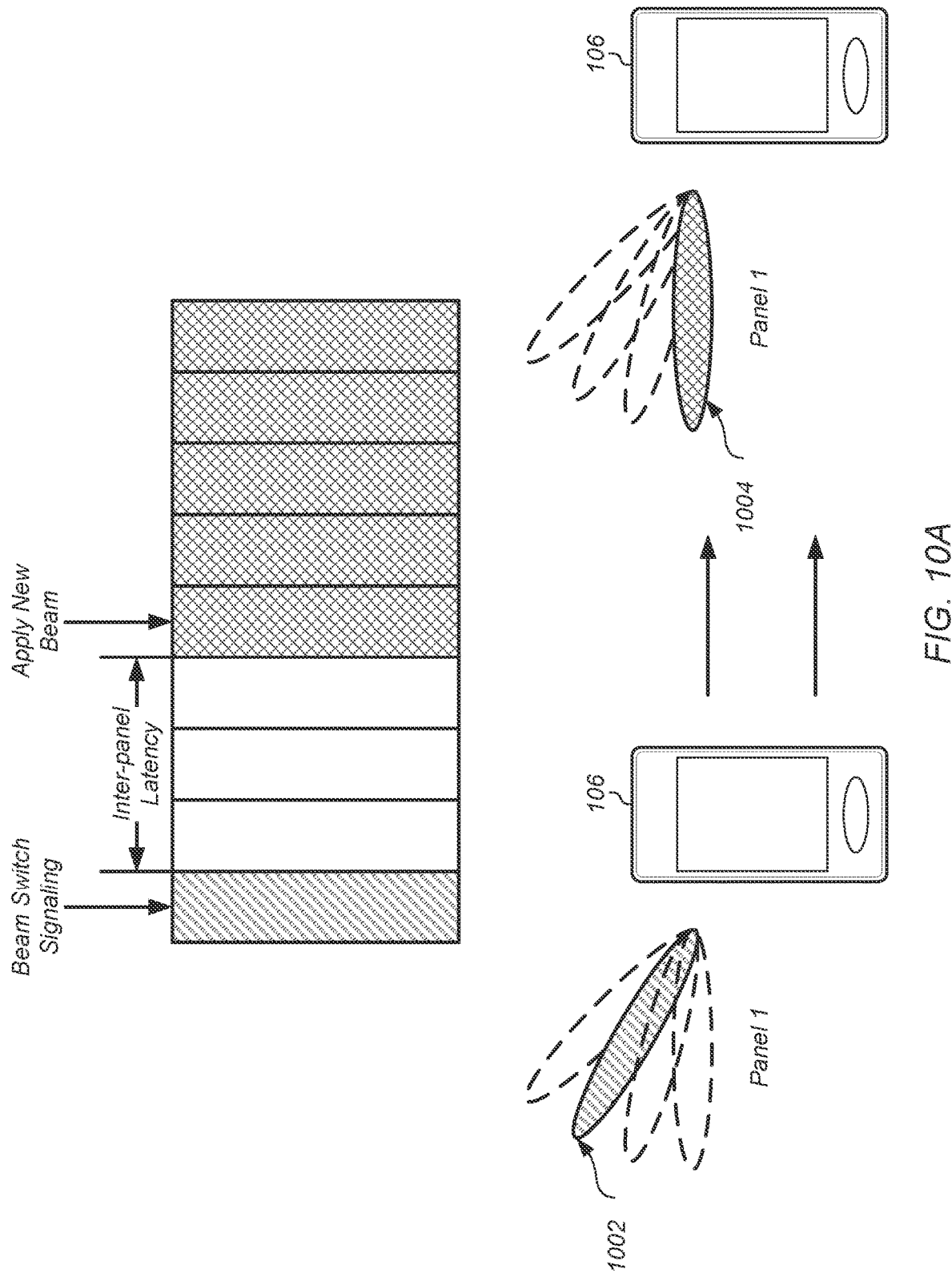
FIGS. 10A and 10B illustrate examples of beam switching latency, according to some embodiments.
Figure 10B:
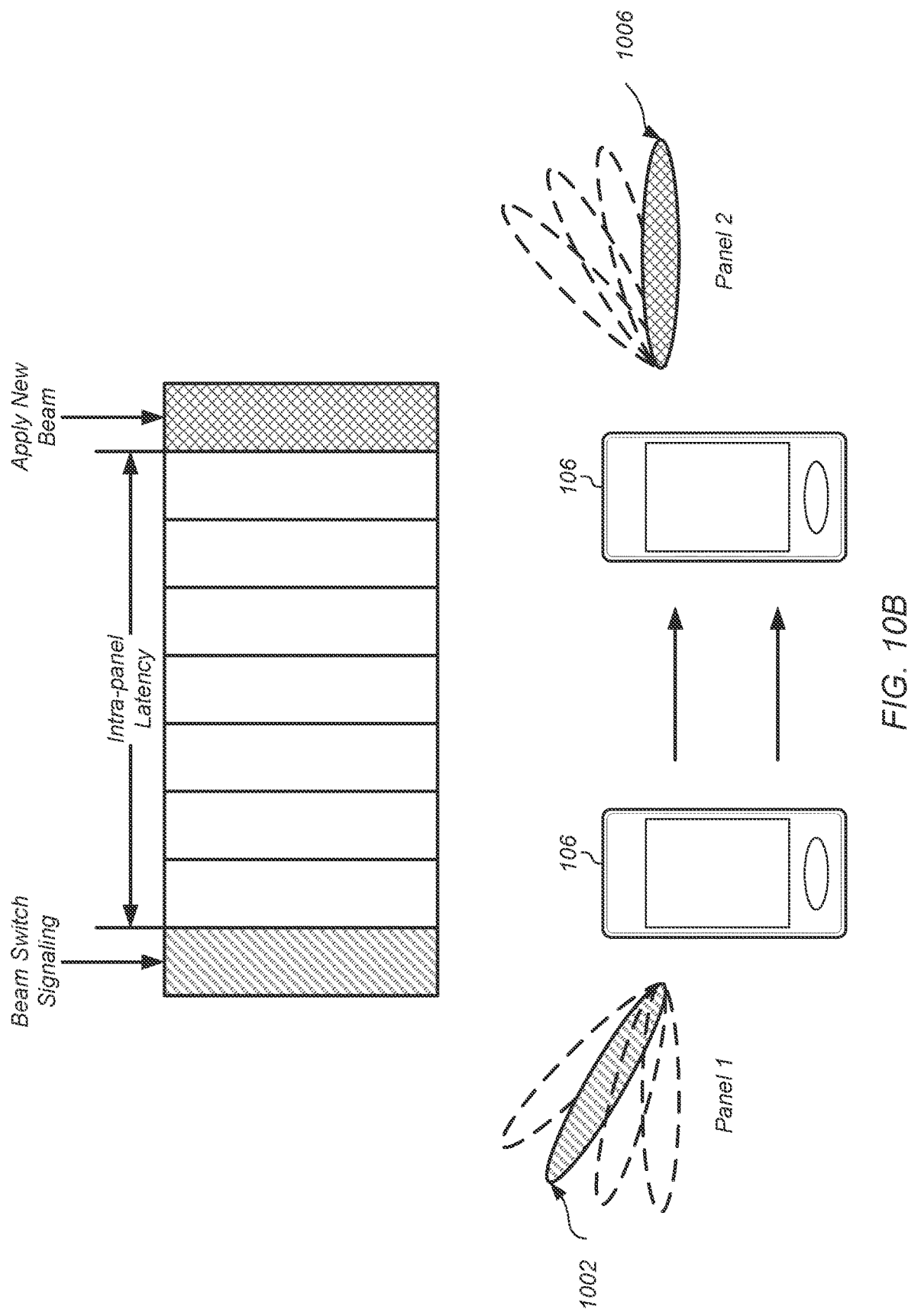

In some embodiments, several levels of beam switching latency may be defined, e.g., as illustrated by FIGS. 10A and 10B. For example, as shown in FIG. 10A, an inter-panel latency, T1, may be a minimal number of slots/symbols for a beam switching within an antenna panel and/or across activated antenna panels. As shown, UE 106 may be communicating via a beam 1002 within an antenna panel 1 and may receive beam switch signaling, from a base station, such as base station 102. UE 106 may then proceed to switch from beam 1002 within antenna panel 1 to beam 1004 within antenna panel 1. The switch may be associated with an inter-panel latency as shown. Once the switch occurs, UE 106 may continue communications with the base station via beam 1004.

As another example, as shown in FIG. 10B, a latency T2 may be a minimal number of slots/symbols for beam switching across inactivated antenna panels. As shown, UE 106 may be communicating via a beam 1002 within an antenna panel 1 and may receive beam switch signaling, from a base station, such as base station 102. UE 106 may then proceed to switch from beam 1002 within antenna panel 1 to beam 1006 within antenna panel 2. The switch may be associated with an intra-panel latency as shown. Once the switch occurs, UE 106 may continue communications with the base station via beam 1006.

In some embodiments, to switch a beam without a beam report and/or when/if a corresponding beam report is out of date, a latency T2 (e.g., an intra-panel latency) may be applied. In some embodiments, different latencies may be applied for different beam indication signaling, e.g., DCI based signaling may have a different latency as compared to MAC CE based signaling as compared to RRC based signaling.

In some embodiments, to report a beam switching latency for a beam, a UE may report a beam switching latency level for each beam in a beam report. For example, a beam report may include RSRP and/or SINR and latency level for a number, N, of SSBs and/or CSI-RSs (e.g., CRIs), e.g., as illustrated by FIG. 11. As shown, a beam report may include a channel state information (CSI) report number as well as optional CSI fields for CRI/SSBRIs (e.g., where an SSBRI is a synchronization signal/physical broadcast channel (SS/PBCH) resource block indicator), differential RSRPs, as well as associated latencies for CRI/SSBRIs. In some embodiments, whether to report a beam switching latency for each beam may be configured by higher layer signaling, such as RRC, MAC CE, and/or Downlink Control Information (DCI) signaling.

In some embodiments, a UE may only report beams with a latency level T1 in a beam report. In such embodiments, other beams not included in the beam report may be considered (or assumed) to have a latency level T2.

Figure 12A:
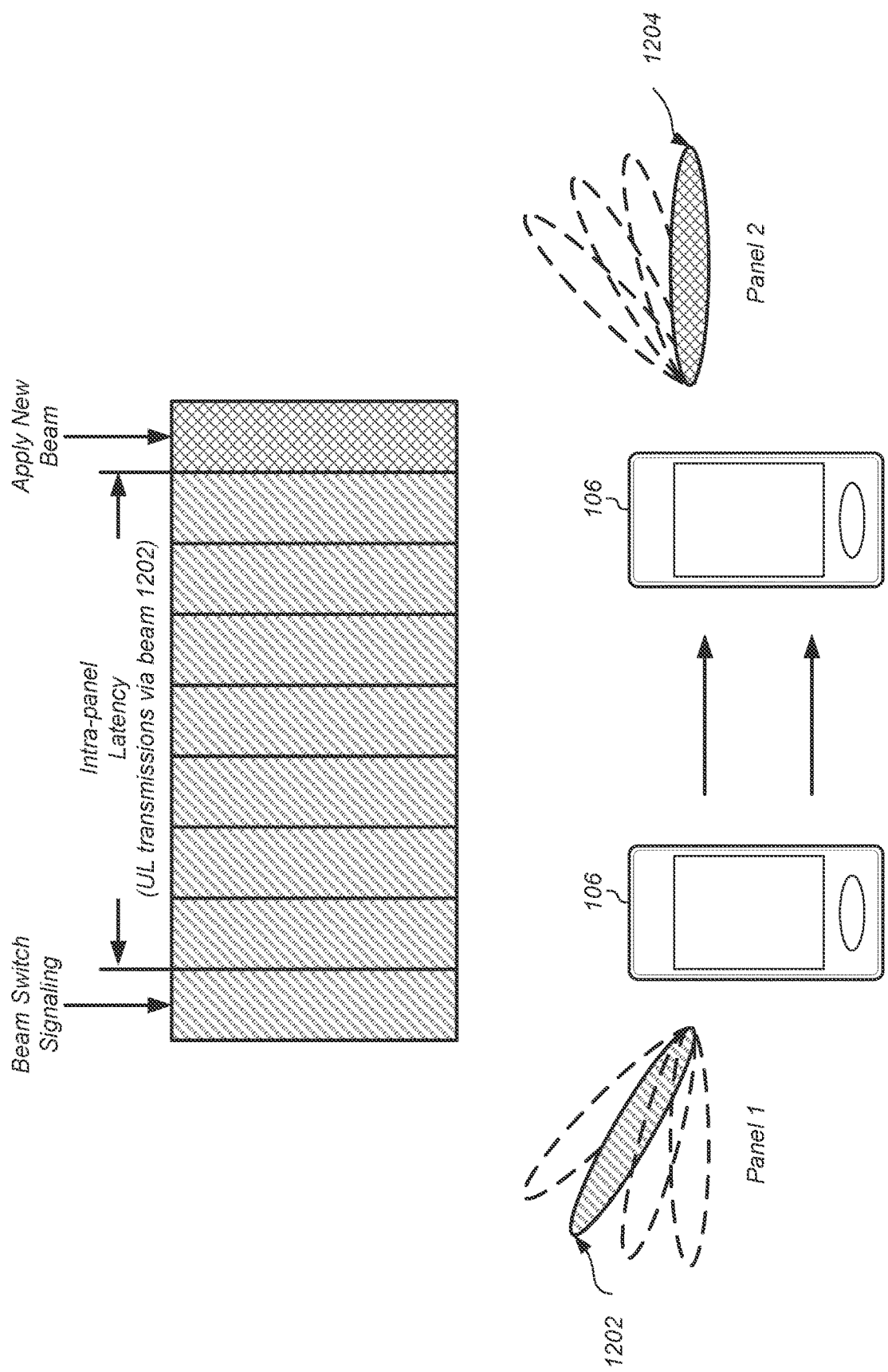
FIGS. 12A and 12B illustrate examples of signaling during a beam switch, according to some embodiments.

In some embodiments, a panel switching indication may be based on a base station beam indication. In some embodiments, a base station may indicate an uplink beam for an uplink channel for a component carrier (CC) or across CCs via higher layer signaling, e.g. such as RRC, MAC CE, and/or Downlink Control Information (DCI) signaling. In some embodiments, prior to an indication taking effect, before T1 or T2 slots/symbols, a UE may apply an old beam for corresponding uplink channel communications, e.g., as illustrated by FIG. 12A. As shown, UE 106 may be communicating via a beam 1202 within an antenna panel 1 and may receive beam switch signaling, from a base station, such as base station 102. For example, the beam switch signal may indicate a switch from TCI 3 to TCI 4. Thus, the UE may be transmitting a signal based on TCI 3 and, upon receiving the beam switching signal, UE 106 may then proceed to switch from beam 1202 within antenna panel 1 to beam 1204 within antenna panel 2. The switch may be associated with an intra-panel latency as shown. Additionally, as shown, UE 106 may continue communications with the base station via beam 1202 based on TCI 3. Once the switch occurs, UE 106 may continue communications with the base station via beam 1204 based on TCI 4.

Figure 12B:
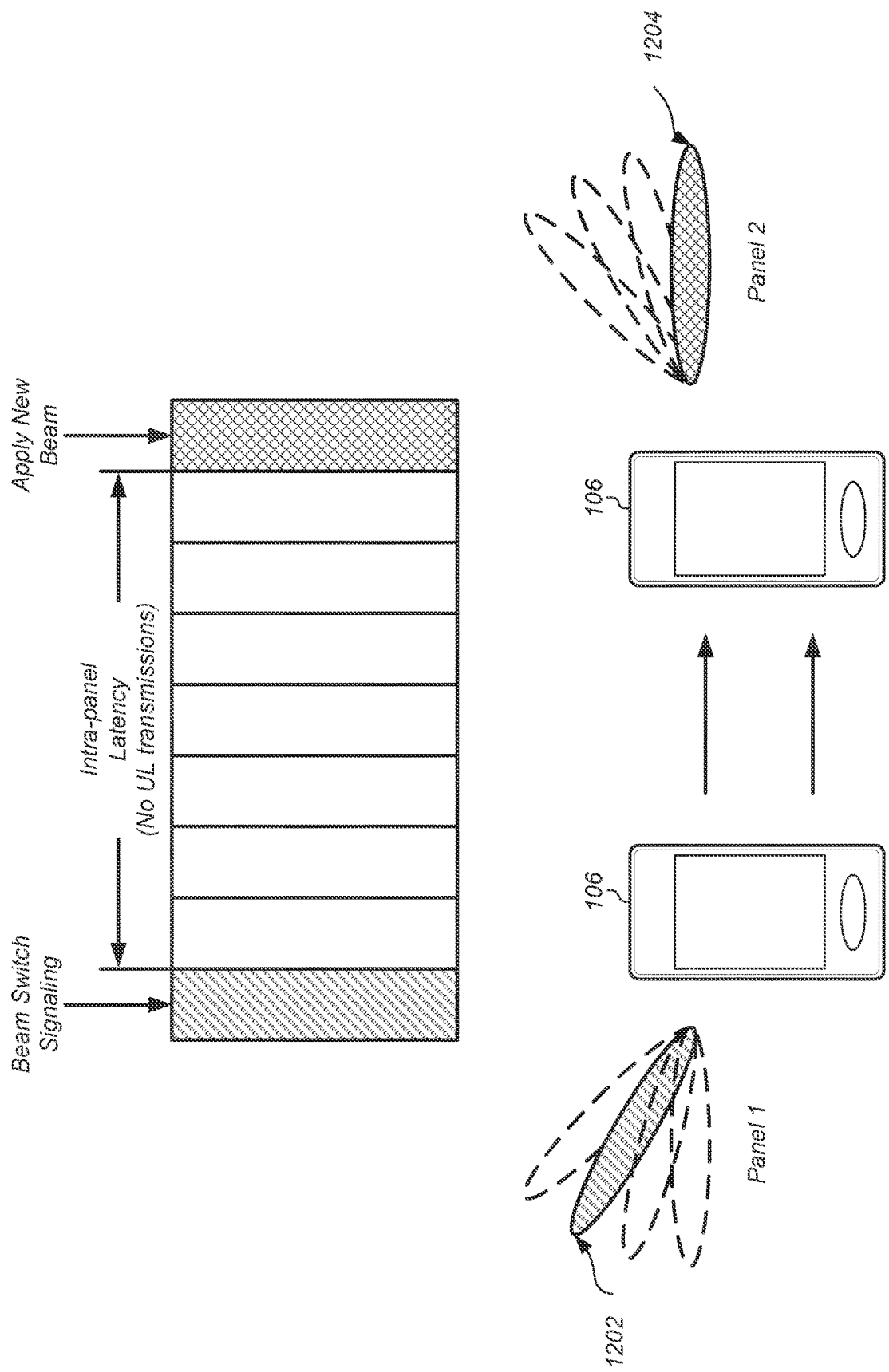

In some embodiments, prior to an indication taking effect, e.g., before T1 or T2 slots/symbols, a UE may not transmit on a corresponding uplink channel regardless of whether the UE is configured/scheduled or not to reduce interference to other cells, e.g., as illustrated by FIG. 12B. For example, the beam switch signal may indicate a switch from TCI 3 to TCI 4. Thus, the UE may be transmitting a signal based on TCI 3 and, upon receiving the beam switching signal, UE 106 may then proceed to switch from beam 1202 within antenna panel 1 to beam 1204 within antenna panel 2. The switch may be associated with an intra-panel latency as shown. Additionally, as shown, UE 106 may discontinue communications with the base station via beam 1202 during the beam switch. Once the switch occurs, UE 106 may continue communications with the base station via beam 1204 based on TCI 4.

In some embodiments, a panel switching indication may be based on triggering via a UE request. For example, in some embodiments, when/if a UE determines to switch an antenna panel, the UE may request a beam report and then a base station may indicate a beam based on the newly reported beam. In some embodiments, the beam report may be request based on physical random access channel (PRACH) and/or a particular scheduling request (SR). In some embodiments, PRACH resources and/or SR resources may be configured by higher layer signaling. In some embodiments, the beam report request can be transmitted in a primary cell (PCell), a physical uplink control channel (PUCCH) enabled secondary cell (SCell), a PUCCH-SCell and/or a particular serving cell.

Figure 13A:
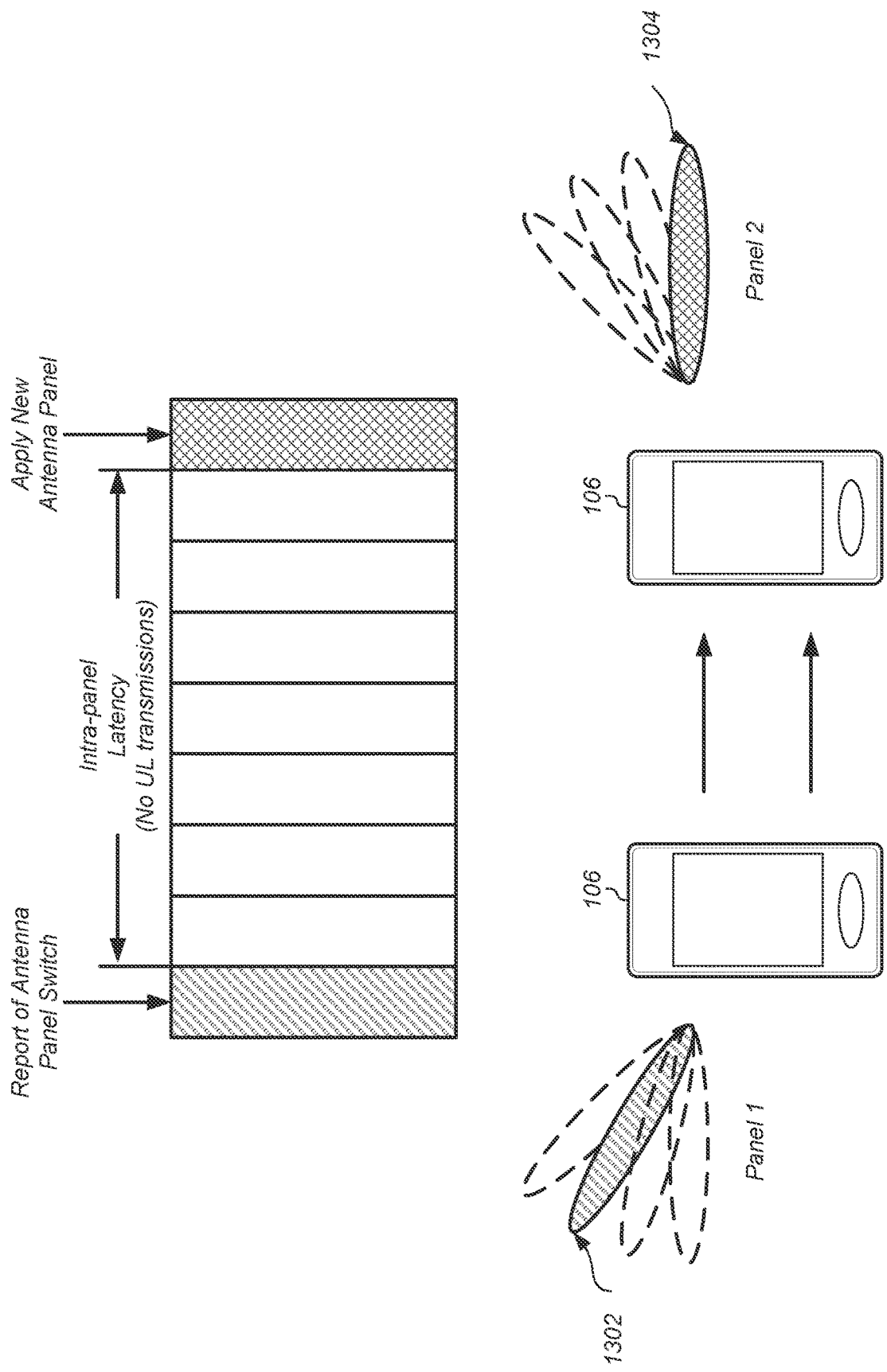
FIGS. 13A and 13B illustrate further examples signaling during a beam switch, according to some embodiments.

As another example, in some embodiments, a UE may report an antenna panel switching that is to be applied, e.g., via PUCCH and/or a MAC CE. In some embodiments, the UE may discontinue uplink transmissions during the beam switch latency period. For example, as illustrated by FIG. 13A, UE 106 may be transmitting via beam 1302 located within antenna panel 1, e.g., based on TCI 3. As shown, after transmitting the report and before UE 106 switches to the new antenna panel (e.g., antenna panel 2), UE 106 may not transmit any uplink signal regardless of whether it is scheduled or not. Once the beam switch has been completed, UE 106 may resume communications with the base station via beam 1304 within antenna panel 2, e.g., based on TCI 3.

Figure 13B:
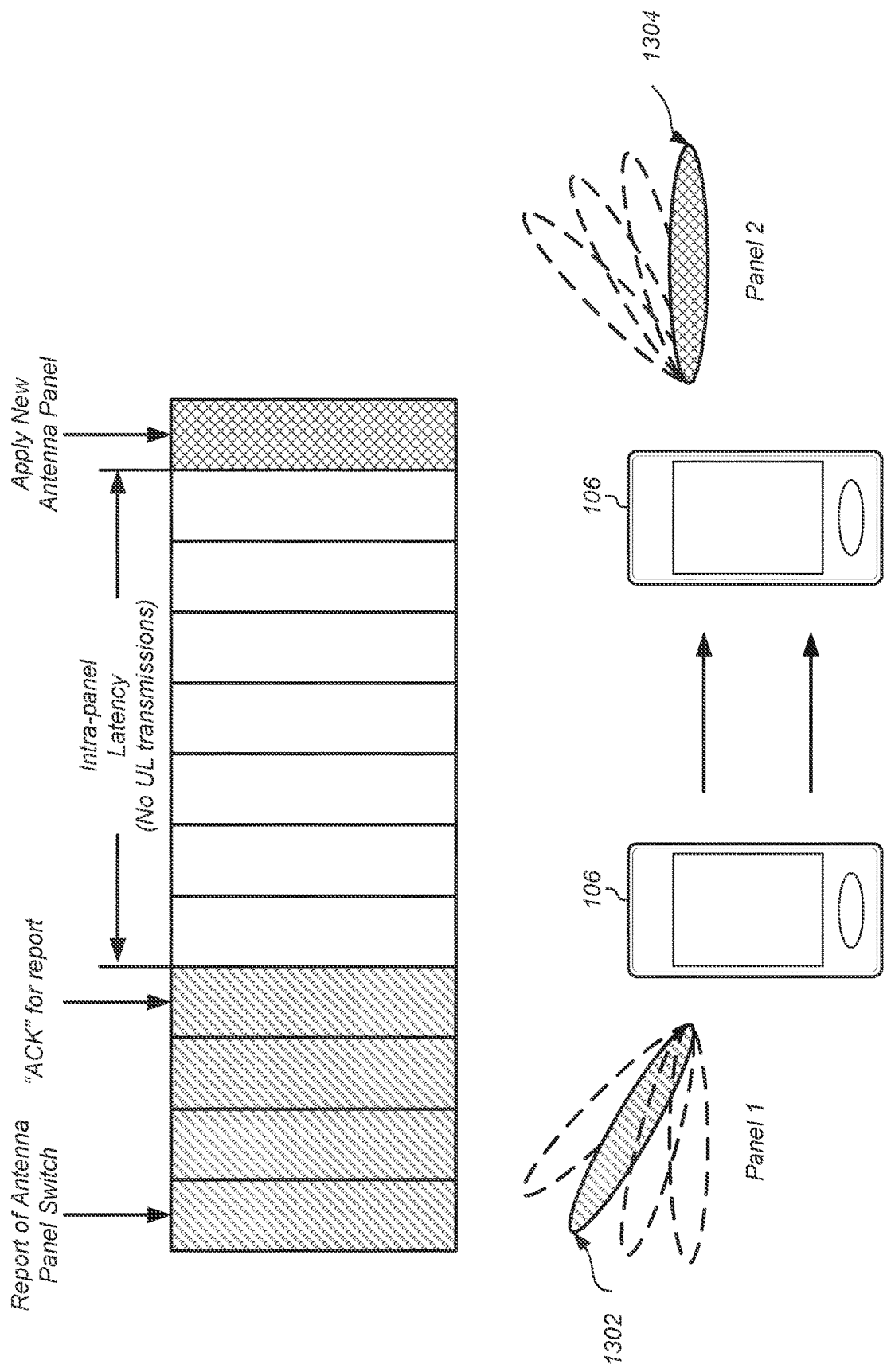

In some embodiments, after receiving an "ACK" for the report and before the UE switches to the new antenna panel, the UE may not transmit any uplink signal regardless of whether it is scheduled or not. For example, as illustrated by FIG. 13B, UE 106 may be transmitting via beam 1302 located within antenna panel 1, e.g., based on TCI 3. As shown, after transmitting the report, UE 106 may wait for an acknowledgment ("ACK") from the base station prior to initiating the switch to the new antenna panel (e.g., antenna panel 2). As shown, once UE 106 receives the "ACK", UE 106 may not transmit any uplink signal regardless of whether it is scheduled or not. Once the beam switch has been completed, UE 106 may resume communications with the base station via beam 1304 within antenna panel 2, e.g., based on TCI 3. In some embodiments, if/when the report is carried by PUCCH, the "ACK" may be a PDCCH in a predefined or configured Control Resource Set (CORESET) and/or search space (SS). In some embodiments, if/when the report is carried by a MAC CE, the "ACK" may be a PDCCH with an uplink grant to schedule a new transmission with a same HARQ process identifier (ID) as that used for the PUSCH with the MAC CE.

Figure 14:
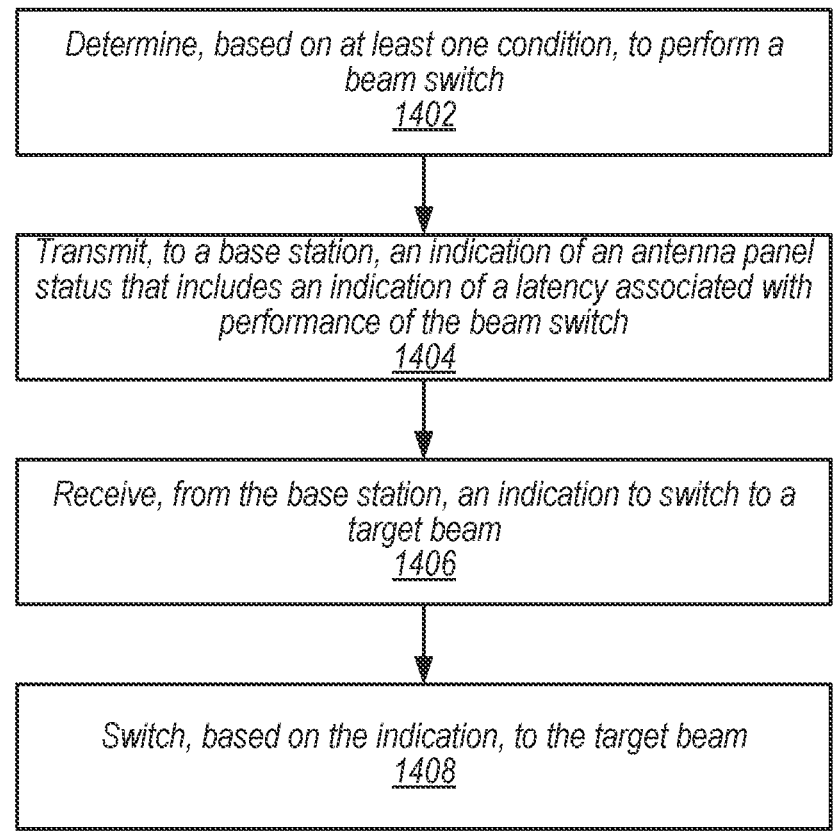
FIG. 14 illustrates a block diagram of an example of a method for uplink antenna panel selection, according to some embodiments.

FIG. 14 illustrates a block diagram of an example of a method for uplink antenna panel selection, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may determine, based on at least one condition, to perform a beam switch from a current beam being used for communications with a base station, such as base station 102, e.g., the UE may determine that a beam switch may be required and/or necessary based on at least one condition (e.g., as measured at the UE). For example, the UE may determine that the current beam is no longer suitable for communications with the base station, e.g., based on at least one condition. In some embodiments, the at least one condition may include any, any combination of, and/or all of (e.g., at least one of) a minimum beam quality from a beam in a first beam set measured from a target antenna panel is larger than a minimum beam quality measured from a current antenna panel plus a margin, a maximum beam quality from a beam in first beam set measured from a target antenna panel is larger than a maximum beam quality measured from the current antenna panel plus a margin, an average beam quality from one or more target beams in a first beam set measured from a target antenna panel is larger than an average beam quality measured from the current antenna panel plus a margin, and/or a beam quality from a target beam in a first beam set measured from a target antenna panel is larger than a beam quality measured from the current antenna panel plus a margin. In some embodiments, the target beam may be configured via higher layer signaling between the UE and the base station. In some embodiments, the higher layer signaling may include any, any combination of, and/or all of (e.g., at least one of) radio resource control signaling, a medium access control (MAC) control element (CE), and/or downlink control information (DCI). In some embodiments, the target beam may be a predefined beam. In some embodiments, the predefined beam may include a first beam corresponding to a lowest transmission configuration indicator (TCI) state index (ID) activated by a medium access control (MAC) control element (CE). In some embodiments, a margin may be configured via higher layer signaling between the HE and the base station, predefined, or reported via a UE capability. In some embodiments, beam quality may be based on any, any combination of, and/or all of (e.g., at least one of) reference signal receiving power (RSRP), a signal-to-interference plus noise ratio (SINR), and/or a power headroom. In some embodiments, the at least one condition may be configured via higher layer signaling between the UE or predefined.

In some embodiments, beam quality may be further based on a maximum power reduction with regard to power emission to a human body. In some embodiments, the maximum power reduction may be beam specific or antenna panel specific. In some embodiments, the UE may report, to the base station, a maximum power reduction for each antenna panel of the UE.

At 1404, the UE may transmit, to the base station, an indication of an antenna panel status. The indication may include an indication of a latency associated with performance of the beam switch. In some embodiments, the latency associated with the beam switch may be based, at least in part, on beam indication signaling. In some embodiments, a different latency may be applied for each type of beam indication signaling. In some embodiments, types of beam indication signaling include radio resource control signaling, medium access control (MAC) control element (CE) signaling, and/or downlink control information (DCI) signaling.

In some embodiments, the indication of the latency associated with the beam switch may indicate whether additional latency is required to switch to a particular beam. In such embodiments, a first latency may be associated with active antenna panel beam switching and a second latency may be associated with a switch to an inactive antenna panel. In such embodiments, an indication of additional latency may indicate the second latency. In some embodiments, the first latency may be defined as a number of slots/symbols necessary to switch beams within an antenna panel or within activated antenna panels and the second latency may be defined as a number of slots/symbols necessary to switch beams from a current antenna panel to an inactivate antenna panel. In some embodiments, a beam switch from a current antenna panel to an activated antenna panel may be assumed to occur at the first latency. In some embodiments, the first latency and the second latency may be predefined for each subcarrier spacing and/or based on a capability of the UE.

In some embodiments, the indication of the antenna panel status may include a beam switching latency level for each beam in a beam report. In some embodiments, the indication of the antenna panel status may include only includes beams with a beam switching latency associated with a first level of latency. In such embodiments, beams not included in the beam report may be assumed to have a beam switching latency associated with a second level of latency. In such embodiments, the first level of latency may be smaller than the second level of latency or the first level of latency may be greater than the second level of latency.

At 1406, the UE may receive, from the base station, an indication to switch to a target beam. In some embodiments, the indication to switch to a target beam may include an indication of a target beam for an uplink channel for a component carrier or across component carriers. In some embodiments, the indication may be received via higher layer signaling. In some embodiments, the higher layer signaling may include any, any combination of, and/or all of (e.g., at least one of) radio resource control signaling, medium access control (MAC) control element (CE) signaling, and/or downlink control information (DCI) signaling. In some embodiments, the UE may, in a time period between receiving the indication and switching to the target beam, continue to transmit using a current beam. In such embodiments, the time period may correspond to the indicated latency. In some embodiments, the UE may, in a time period between receiving the indication and switching to the target beam, discontinue transmissions using a current beam. In such embodiments, the time period may correspond to the indicated latency.

In some embodiments, the indication may include a beam switch request, wherein the beam switch request indicates the target beam. In some embodiments, when the beam switch request includes a beam report, the beam report may be based, at least in part, on a physical random access channel resource or a scheduling request resource. In some embodiments, the physical random access channel resource and/or the scheduling request resource may be configured via higher layer signaling. In such embodiments, the higher layer signaling may include at least one of radio resource control signaling, medium access control (MAC) control element (CE) signaling, or downlink control information (DCI) signaling. In some embodiments, the beam report may be requested in any, any combination of, and/or all of (e.g., at least one of) a primary cell, a physical uplink control channel (PUCCH) enabled secondary cell (SCell), a PUCCH-SCell; and/or a serving cell.

In some embodiments, the beam switch request may include an indication that an antenna panel switch is to be applied by the UE. In some embodiments, the beam switch request may be transmitted via at least one of a physical uplink control channel or a medium access control (MAC) control element (CE). In some embodiments, in a time period between receiving the indication and switching to the target beam, the UE may discontinue transmissions using a current beam. In such embodiments, the time period may correspond to the indicated latency.

In some embodiments, in a time period between receiving the indication and switching to the target beam, the further comprises the UE may continue, during a first portion of the time period, to transmit using a current beam until an acknowledgment is received from the base station. The UE may discontinue, during a second portion of the time period, transmissions using the current beam after acknowledgement is received from the base station. In such embodiments, the second portion of the time period may correspond to the indicated latency.

In some embodiments, when the beam switch request is transmitted via a physical uplink shared channel, the acknowledgment may be received via a physical downlink control channel in a control resource set (CORESET) or search space (SS). In such embodiments, the CORESET and/or SS may be predefined or configured.

In some embodiments, when the beam switch request is transmitted via a MAC CE, the acknowledgment may be received via a physical downlink control channel with an uplink grant to schedule a new transmission with a hybrid automatic repeat request (HARQ) process index used for a physical uplink shared channel with the MAC CE.

At 1408, the UE may switch, based on the indication, to the target beam. In other words, the UE may switch communications from a current beam to the target beam, e.g., by expiration of a time period associated with the indicated latency.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   determining, based, at least in part, on at least one condition, to perform a beam switch from a current beam being used for communications with a base station;
   transmitting, to the base station and based on determining to perform the beam switch, an indication of an antenna panel status, wherein the indication includes an indication of a latency associated with the beam switch and a beam switch request that includes an indication that an antenna panel switch is to be applied;
   receiving, from the base station, an indication to switch to a target beam; and
   performing the switch, based on the indication, to the target beam, wherein performance of the switch occurs within a time period associated with the latency.

2. The method of claim 1,
   wherein the at least one condition includes at least one of:
   a minimum beam quality from a beam in a first beam set measured from a target antenna panel is larger than a minimum beam quality measured from a current antenna panel plus a margin;
   a maximum beam quality from a beam in first beam set measured from a target antenna panel is larger than a maximum beam quality measured from the current antenna panel plus a margin;
   an average beam quality from one or more target beams in a first beam set measured from a target antenna panel is larger than an average beam quality measured from the current antenna panel plus a margin; or
   a beam quality from a target beam in a first beam set measured from a target antenna panel is larger than a beam quality measured from the current antenna panel plus a margin.

3. The method of claim 2,
   wherein the target beam is configured via higher layer signaling with the base station or is a predefined beam; and
   wherein the higher layer signaling includes at least one of:
   radio resource control signaling;
   a medium access control (MAC) control element (CE); or
   downlink control information (DCI); and
   wherein the predefined beam includes a first beam corresponding to a lowest transmission configuration indicator (TCI) state index (ID) activated by a medium access control (MAC) control element (CE).

4. The method of claim 2,
   wherein a margin is configured via higher layer signaling with the base station, predefined, or reported via a user equipment device (UE) capability.

5. The method of claim 2,
   wherein beam quality is based on at least one of:
   reference signal receiving power (RSRP);
   a signal-to-interference plus noise ratio (SINR); or
   a power headroom.

6. The method of claim 2,
   wherein beam quality is further based on a maximum power reduction with regard to power emission to a human body;
   wherein the maximum power reduction is beam specific or antenna panel specific; and
   wherein the method further comprises reporting, to the base station, a maximum power reduction for each antenna panel.

7. The method of claim 1,
   wherein the at least one condition is configured via higher layer signaling with the base station or predefined.

8. The method of claim 1,
   wherein the latency associated with the beam switch is based on beam indication signaling, and wherein a different latency is applied for each type of beam indication signaling; and
   wherein types of beam indication signaling include radio resource control signaling, medium access control (MAC) control element (CE) signaling, or downlink control information (DCI) signaling.

9. The method of claim 1,
   wherein the indication of the latency associated with the beam switch indicates whether additional latency is required to switch to a particular beam, wherein a first latency is associated with active antenna panel beam switching, wherein a second latency is associated with a switch to an inactive antenna panel, and wherein an indication of additional latency indicates the second latency;
   wherein the first latency is defined as a number of slots/symbols necessary to switch beams within an antenna panel or within activated antenna panels;
   wherein a beam switch from a current antenna panel to an activated antenna panel is assumed to occur at the first latency; and
   wherein the second latency is defined as a number of slots/symbols necessary to switch beams from a current antenna panel to an inactivate antenna panel.

10. The method of claim 9,
    wherein the first latency and the second latency are predefined for each subcarrier spacing or based on a capability.

11. A baseband processor comprising circuitry configured to cause a device to:
    determine, based, at least in part, on at least one condition, to perform a beam switch for a current beam being used for communications with a base station;
    transmit, to the base station and based on determining to perform the beam switch, an indication of an antenna panel status, wherein the indication includes an indication of a latency associated with the beam switch and a beam switch request that includes an indication that an antenna panel switch is to be applied by the device; and
    receive, from the base station, an indication to switch to a target beam.

12. The baseband processor of claim 11,
    wherein the indication of the antenna panel status includes a beam switching latency level for each beam in a beam report.

13. The baseband processor of claim 12,
    wherein the indication of the antenna panel status only includes beams with a beam switching latency associated with a first level of latency; and
    wherein beams not included in the beam report are assumed to have a beam switching latency associated with a second level of latency.

14. The baseband processor of claim 11,
    wherein the indication to switch to a target beam includes an indication of a target beam for an uplink channel for a component carrier or across component carriers;

wherein the indication is received via higher layer signaling, wherein the higher layer signaling includes at least one of radio resource control signaling, medium access control (MAC) control element (CE) signaling, or downlink control information (DCI) signaling; and wherein, in a time period between receiving the indication and switching to the target beam, the circuitry is further configured to cause the device to:
  continue to transmit using a current beam, wherein the time period corresponds to the indicated latency; or
  discontinue transmissions using a current beam, wherein the time period corresponds to the indicated latency.

15. The baseband processor of claim 11,
wherein the indication includes a beam switch request, wherein the beam switch request indicates the target beam;
wherein the beam switch request includes a beam report, and wherein the beam report is based on a physical random access channel resource or a scheduling request resource;
wherein the physical random access channel resource or the scheduling request resource is configured via higher layer signaling, wherein the higher layer signaling includes at least one of radio resource control signaling, medium access control (MAC) control element (CE) signaling, or downlink control information (DCI) signaling; and
wherein the beam report is requested in at least one of:
  a primary cell;
  a physical uplink control channel (PUCCH) enabled secondary cell (SCell);
  a PUCCH-SCell; or
  a serving cell.

16. A non-transitory computer readable memory medium storing program instructions executable by processing circuitry to cause a user equipment device (UE) to:
  determine, based, at least in part, on at least one beam quality based condition, to perform a beam switch from a current beam being used for communications with a base station;
  transmit, to the base station, an indication of an antenna panel status, wherein the indication includes an indication of a latency associated with the beam switch and a beam switch request that includes an indication that an antenna panel switch is to be applied by the UE;
  receive, from the base station, an indication to switch to a target beam; and
  perform the switch, based on the indication, to the target beam within a time period associated with the latency.

17. The non-transitory computer readable memory medium of claim 16,
wherein the beam switch request indicates the target beam; and
wherein the beam switch request is transmitted via at least one of a physical uplink control channel or a medium access control (MAC) control element (CE).

18. The non-transitory computer readable memory medium of claim 17,
wherein, in a time period between receiving the indication and switching to the target beam, the program instructions are further executable by processing circuitry to cause the UE to discontinue transmissions using a current beam, wherein the time period corresponds to the indicated latency.

19. The non-transitory computer readable memory medium of claim 17,
wherein, in a time period between receiving the indication and switching to the target beam, the program instructions are further executable by processing circuitry to cause the UE to:
  continue, during a first portion of the time period, to transmit using a current beam until an acknowledgment is received from the base station; and
  discontinue, during a second portion of the time period, transmissions using the current beam after acknowledgement is received from the base station, wherein the second portion of the time period corresponds to the indicated latency.

20. The non-transitory computer readable memory medium of claim 19,
wherein when the beam switch request is transmitted via a physical uplink shared channel, the acknowledgment is received via a physical downlink control channel in a control resource set (CORESET) or search space (SS), wherein the CORESET/SS is predefined or configured; and
wherein when the beam switch request is transmitted via a MAC CE, the acknowledgment is received via a physical downlink control channel with an uplink grant to schedule a new transmission with a hybrid automatic repeat request (HARQ) process index used for a physical uplink shared channel with the MAC CE.

* * * * *